United States Patent Office 3,014,267
Patented Dec. 26, 1961

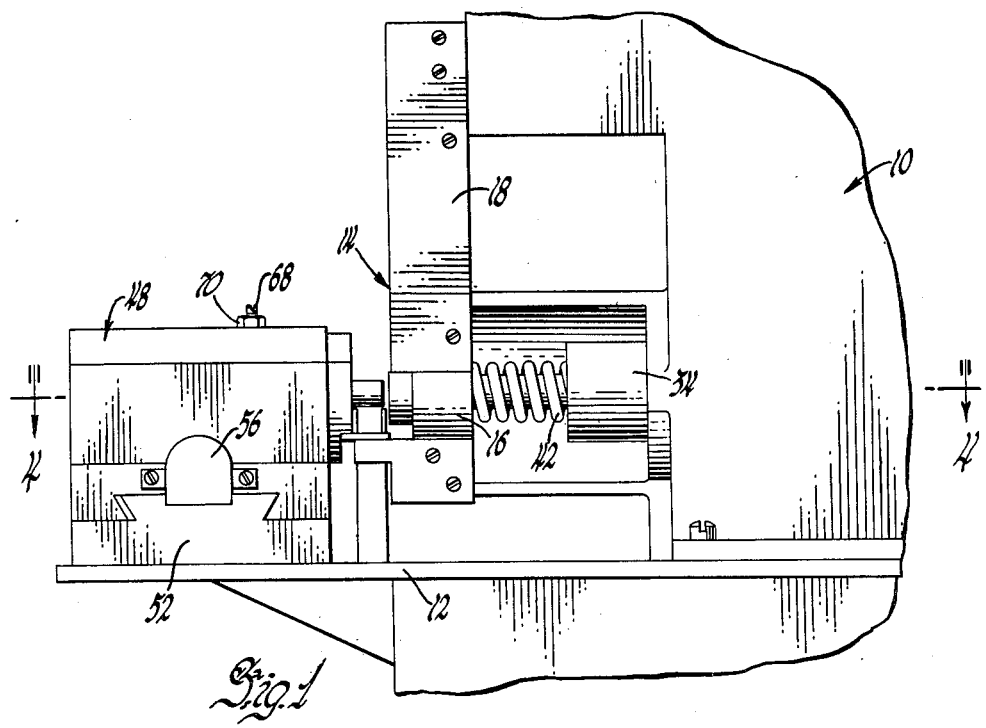
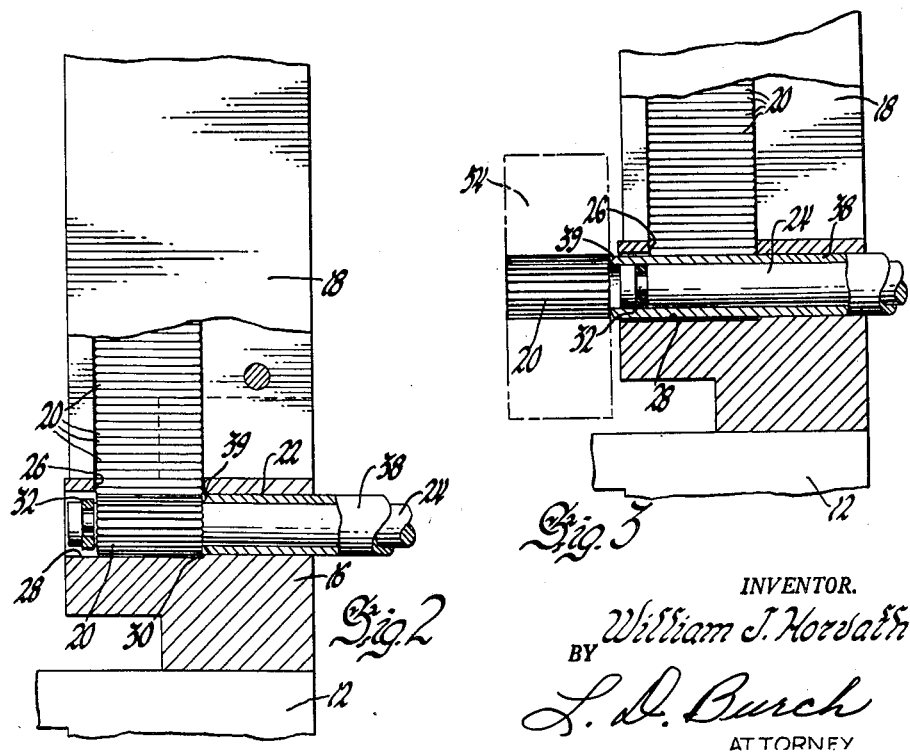

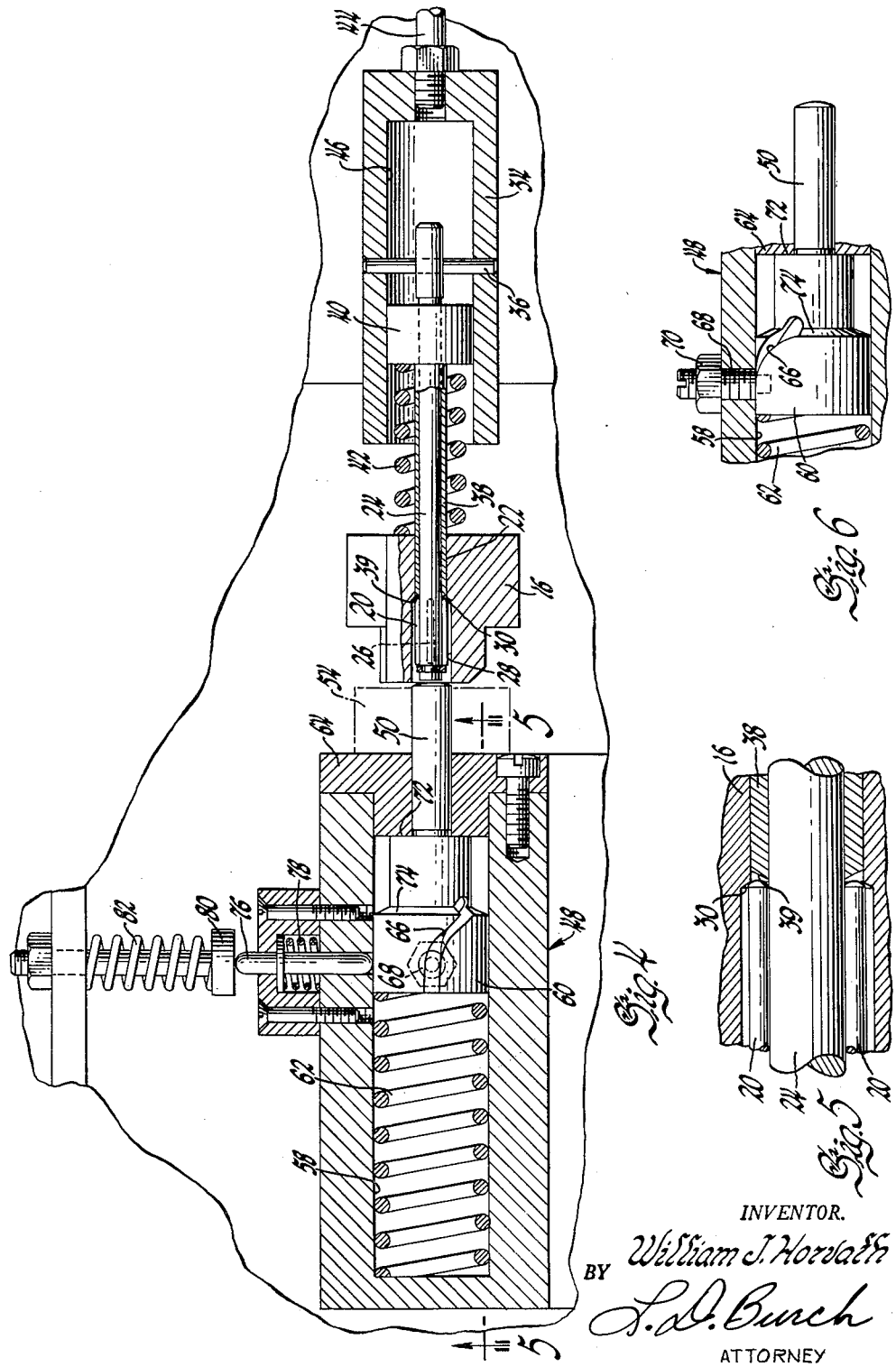

3,014,267
METHOD OF ASSEMBLING AND SECURING ELONGATED MEMBERS IN A RETAINER STRUCTURE
William J. Horvath, Inkster, Mich., assignor to General Motors Corporation, Detroit, Mich., a corporation of Delaware
Original application July 26, 1955, Ser. No. 524,321, now Patent No. 2,946,117, dated July 26, 1960. Divided and this application June 19, 1959, Ser. No. 821,466
10 Claims. (Cl. 29—148.4)

This invention relates to a method of temporarily securing an assembly of roller bearings within a receiving member by a "keystoning type" assembly process.

This application is a division of the copending application Serial No. 524,321, filed July 26, 1955, now Patent No. 2,946,117, granted July 26, 1960, in the name of William J. Horvath.

The present invention may be more clearly understood by reference to the prior art. The use of a "keystoning" process to temporarily retain roller bearing elements within a cylindrical housing has become a well known expedient. Such "keystoning" processes involve the positioning of a plurality of roller bearing elements in surface engagement with one another and with the inner peripheral surface of a cylindrical retainer housing. The longitudinal axes of the roller bearing members are parallel to one another and to the central axis of the cylindrical retainer. The roller bearing members are provided with diametrical dimensions such that when they are in surface contact with one another and with the inner peripheral surface of the circumjacent cylindrical retainer, they occupy a circumferential volume slightly greater than the circumferential volume immediately circumjacent the inner periphery of the cylindrical retainer. In this manner the roller members are securely held circumjacent the inner periphery of the cylindrical retainer and cannot be displaced radially inwardly. Roller bearings are mounted in such a manner to prevent the bearings from becoming displaced during storage and transportation prior to and during installation. Such an arrangement provides obvious advantages and economies during shipping and installation processes.

It is an object of this invention to provide an improved method for keystoning roller bearings or the like within a receiving member. Another object of this invention is to provide a method of retaining roller members or the like within a receiving member during storage and transportation prior to a final assembly operation. A further object of this invention is to provide a method of increasing frictional engagement of "keystoned" bearing members to compensate for variations in dimensions of retainer members and bearing members which might otherwise allow accidental displacement of "keystoned" bearing members. Another object of this invention is to provide a method of retaining a lesser number of roller bearing members of a particular diameter than required for previous "keystoning" processes within a particularly dimensioned receiving member. It is also an object of this invention to provide a temporary "keystoning" type process for retaining a plurality of roller bearing members within a receiving member prior to a final assembly in bearing relationship with a shaft or similar member whereat the roller bearing members will be released from the temporary "keystoned" arrangement.

The foregoing objects are accomplished by a "keystoning" type process which differs from previously known roller bearing "keystoning" as hereinafter described. In previous practice the roller members were "keystoned" within a retainer prior to final assembly and maintained in the "keystoned" relationship after final assembly. Dimensional variations of the parts often resulted in an ineffective "keystoning" of the roller members. It is now proposed to provide a method of increasing frictional engagement of "keystoned" roller members to assure effective "keystoning." It is also proposed to use a "keystone" type process to retain roller members within a retainer prior to final assembly and to release the roller members from the "keystoned" condition during final assembly. In accordance with the invention, a plurality of roller bearing members are loosely mounted within the retaining member closely adjacent the inner peripheral surface thereof. The longitudinal axes of the roller bearing members are parallel to the central axis of the retainer member and the roller bearing members will be radially inwardly displaced unless retained by some additional means when the axes thereof are parallel. In order to secure the roller bearing members within the retainer, they are twisted as a unit relative to the retainer member so that the axes of the roller members remain parallel to one another, but are skewed relative to the central axis of the retainer. Such a movement causes uniform radial inward displacement of the roller bearing members to a position whereat adjacent roller members are in frictional engagement with one another and a "keystoning" effect is attained. A sufficient twisting force is applied to the roller bearing members to maintain them in the frictionally self-supporting condition until they are ready for assembly. By exerting a counter-twisting movement during assembly with a shaft member, the bearing members will be loosened and returned to their original parallelly aligned condition relative to the retainer member; and consequently, will be parallel to the shaft member. The term "keystoning" as hereinafter used in the specification is therefore defined to be the frictional interlock obtained by twisting a plurality of roller bearing members relative to a retainer member to obtain a "keystoning" effect.

In the drawings:

FIGURE 1 is a side view of a part of a roller bearing assembly machine including the present invention.

FIGURE 2 is an enlarged side view of part of the roller bearing assembly means incident to the present invention.

FIGURE 3 is the same as FIGURE 2, showing the roller bearings extracted from the bearing feed device.

FIGURE 4 is an enlarged cross-sectional view of the proposed device taken in the plane of line 4—4 of FIGURE 1 looking in the direction of the arrows thereon.

FIGURE 5 is a cross-sectional view of a feature of the present invention as viewed in the plane of line 5—5 of FIGURE 4 looking in the direction of the arrows thereon, to illustrate the manner in which the bearing members are prepared for assembly.

FIGURE 6 is a view of a feature of the present invention with parts broken away and in section to illustrate the means for keystoning the bearing members in the supporting piece.

The present invention is here shown incorporated within a roller bearing assembly machine which has been greatly simplified for illustration purposes. Such simplification is not intended to limit the scope of the present invention in any manner or form.

The roller bearing assembly machine 10 is shown to include a base 12 having roller bearing feed means 14 secured thereto. The feed means includes a support member 16 to which is connected a roller bearing feed chute 18 having an orderly column of adjacently disposed roller bearings 20 maintained therein. Within the support member 16, there is provided a bore 22 within which is disposed a pilot member 24 about which roller bearings 20 are circumferentially fed through an elongated access 26 provided through the support and which is the size of one of the roller bearings. Once an annulus of bearings is disposed about the pilot member, the feed thereto is cut off. The bore 22 is slightly enlarged as at 28 to accommodate the roller bearings 20 and is chamfered as at 30 to prevent axial movement of the bearings beyond the enlarged part of the bore. A compressible snap or O ring 32 is also disposed about the end of the pilot member to restrain unintentional axial movement of the bearing members in the other direction.

The pilot member 24 extends within a control cylinder 34 spaced apart from support 16 and is secured against axial movement by means such as pin 36. A sleeve member 38 is concentrically disposed about the pilot member 24 and extends within the bore 22 and within the control cylinder 34, where it includes piston head 40. Spring means 42 disposed about the sleeve member and engaging the support member 16 and piston head 40 biases the sleeve in a retracted position removed from the bearing receiving portion 28 of bore 22. An air fitting 44 provided in the end of cylinder 34 admits air pressure within chamber 46 which acts upon the piston head 40 to move the sleeve member 38 to engage the annulus of roller bearings disposed about the pilot member 24. The end of the sleeve is chamfered as at 39 to force the pins radially outward in the course of axial movement thereof.

Spaced apart from the roller bearing feed means 14 is a housing 48 having a retractable support pin 50 extended towards the feed device. The housing 48 is movable relative to the feed device 14 on guideway 52 to permit placing a bearing receiving member or receptable 54, shown in phantom in FIGURES 3 and 4, on the pin 50 and then moving the member into alignment with the feed device. Limit stop means 56, which engages guideway 52, is provided on housing 48 to assure the proper repositioning of the housing adjacent the feed device.

The housing 48 includes a bore 58 within which is disposed a plunger 60 biased by spring means 62 to normally extend through end wall 64 to provide the retractable support pin 50. The plunger 60 includes a spiral cam groove 66 formed therein which receives a guide pin 68 provided through the side wall of housing 48 and set by lock nut 70. Axial travel of the plunger thus includes rotational movement in accord with the dictate of the cam groove 66. The plunger 60 includes a shoulder 72 engaging end wall 64 to limit its outwardly biased travel and a shoulder 74 engaged by a detent 76 extended through the side wall of housing 48 to retain the pin 50 in a retracted position. Detent 76 is normally biased by spring means 78 out of engagement with plunger 60. However, when the housing 48 is positioned adjacent the feed device 14, a biased stop 80 including spring means 82 is engaged by the detent, overcoming the retracting force of spring 78 and biasing the detent in engagement with the plunger.

In operation, the movable housing 48 is disposed to receive a bearing receptacle 54 upon the retractable pin 50 and is then moved on guideway 52 to the limits of stop 56 to dispose the housing and pin in axial alignment with the pilot member 24 of the feed device 14. In such position the detent 76 is engaged by stop 80 to hold the detent engaged with the plunger 60.

During the loading of the bearing receiving member 54 upon support pin 50, roller bearings 20 are circumferentially arranged about pilot member 24 to form an annulus of roller bearings which are to be loaded within the receiving member by the sleeve member 38 disposed therebehind.

With housing 48 in position, air is admitted to chamber 46 of control cylinder 34 to act on piston head 40 and move sleeve 38, guided within bore 22 and upon the pilot member 24, to engage the roller bearings disposed about the pilot member and move them axially toward O ring 32. The annulus of bearings 20 compresses the snap ring 32 and moves on to engage the retractable support pin 50 which holds the bearing receiving member 54. As the bearings are moved into member 54 and the pin 50 is displaced, plunger 60 is moved back into housing 48 against the force of spring 62 and is rotated by guide pin 68, engaged in cam groove 66. The support pin 50 being engaged with one end of the roller bearings and being rotated while the sleeve member 38 is not rotated, effects a circumferential displacement of the ends of the roller bearings engaging the rotating pin 50 and keystones the bearings within the receiving member 54.

A plurality of cylindrical members, as are needle roller bearings, which are annularly disposed, will be in a keystoned relation if positively and firmly engaged with each next adjacent cylindrical member in the manner of an arch keystone from which the word keystoning originated. The difficulty which has been experienced in such a keystone bond with needle roller bearings is that certain tolerances are required between the diameter of the roller bearings and the width of the annular space within which they are first loaded, and between the roller bearings themselves, to facilitate their loading. These tolerances, in turn, minimize the effectiveness of the keystone bond since the roller bearings may be expanded outwardly, as by a severe jolt, and allow one of the bearings to fall through and break the bond.

By circumferentially displacing the ends of the annularly disposed roller bearings in opposite directions the ends of the roller bearings may be moved radially outward to take up the tolerance provided in the annular loading space, or the receiving member, and the portion of the bearings intermediate the ends is moved radially inward to take up the tolerance provided between the bearings which facilitates adjacent loading. With the ends of the roller bearings frictionally engaged with the inner surface of a retainer member within which received and the intermediate portions of the roller bearings positively engaged with each next roller bearing, the keystone bond is made secure.

The chamfered ends of the retractable support pin 50 and of the cylindrical loading sleeve 38 assure that the ends of the needle roller bearings will be urged radially outward in the course of their axial and relative rotational movement to within the bearing receiving member 54. With the rotational movement of the retractable support pin 50 arranged to occur near the end of the travel movement of the roller bearing within the receiving member, adequate tolerances may be provided to facilitate greater ease in loading the roller bearings within the receiving member and at the last minute such tolerances may be taken up in the manner proposed.

Upon the final displacement of pin 50 from the bearing receiving member 54, at which time the roller bearings are properly held by keystoning therein, the loaded member 54 is free to drop into a receiving basket or the like. At such time shoulder 74 of plunger 60 is engaged by detent 76 and held in a retracted position. The return of sleeve 38 to its original position, by exhausting air from chamber 46 to permit spring 42 to effect the return, may be used to signal the return of housing 48 to a position where another bearing receiving member may be received. As the housing is moved away from stop 56 detent 76, being released from stop 80, is retracted by spring 78 and plunger 60 is moved forward by spring 62 until shoulder 72 engages wall 64 and pin 50 is positioned to receive another bearing receptacle.

What is claimed:

1. The method of obtaining a more secure keystone engagement in the arcuate arrangement of members which includes, disposing a plurality of members in adjacent arcuate disposition and relatively rotating opposite ends of said members in opposite directions for urging said ends radially outward into more positive engagement with a receiving structure and the intermediate portions thereof radially inward for more positive engagement with each next adjacent member.

2. The method of obtaining a more secure keystone engagement in the annular disposition of cylindrical members within a receiving member and which includes circumferentially displacing adjacently disposed ends of said cylindrical members relative to their opposite ends for urging opposite ends of said cylindrical members radially outward and into more positive engagement with said receiving member and urging the portions of said cylindrical members intermediate the ends thereof radially inward into more positive keystoned engagement with each next adjacent intermediate portion of said cylindrical members.

3. A method of temporarily securing a plurality of cylindrical members within a retainer member by disposing said plurality of said cylindrical members in adjacent arcuate disposition within said retainer member, circumferentially displacing the opposite ends of said cylindrical members in opposite directions relative to said retainer member, and concurrently positioning said cylindrical members radially inwardly in frictional locking engagement with one another.

4. A method of securing a plurality of members in assembled position within a retainer in a position of peripheral engagement therewith and defining a passage therethrough by the steps of disposing a plurality of said members in adjacent arcuate disposition within said retainer, and relatively circumferentially displacing the opposite ends of said members in opposite directions until adjacent members are frictionally interlocked with one another within said retainer and said members are peripherally engaged within said retainer.

5. A method of securing a plurality of members within a retainer in a position of peripheral engagement therewith by the steps of disposing a plurality of said members in adjacent arcuate disposition within said retainer, and twisting the opposite end portions of said members in opposite directions to cause radial inward movement of said members into frictional locking engagement with one another and said retainer.

6. The method of temporarily securing a plurality of roller bearing members within a bearing retainer for unit handling prior to final assembly circumjacent a shaft member, and comprising the steps of disposing a plurality of said roller bearing members in adjacent arcuate disposition within said bearing retainer, applying force to said roller bearing members to cause circumferential displacement thereof and radial inward movement thereof into a frictional locking engagement with one another and said bearing retainer whereby said roller bearing members and said bearing retainer from a non-separable unit for handling prior to final assembly.

7. The method of temporarily securing a plurality of roller bearing members within a bearing retainer for unit handling prior to final assembly thereof circumjacent a shaft member, and comprising the steps of disposing a plurality of said members in adjacent arcuate disposition within said bearing retainer, applying force to said roller bearing members to cause circumferential displacement thereof and radial movement thereof into a frictional locking engagement with one another and said bearing retainer whereby said roller bearing members and said bearing retainer form a nonseparable unit for handling prior to final assembly, assembling said unit circumjacent said shaft member, and applying an oppositely directed force to said roller bearing members to cause reverse circumferential displacement of the ends thereof and radial outward movement thereof into a bearing-forming posititon between said bearing retainer and said shaft member.

8. The method of temporarily securing a plurality of bearing members within a bearing retainer for unit handling prior to final assembly circumjacent a shaft member and comprising the steps of disposing a plurality of said members in loose adjacent arcuate disposition within said bearing retainer, applying force to said bearing members to cause circumferential displacement thereof and radial inward movement thereof into a frictional locking engagement with one another and said bearing retainer whereby said bearing members and said bearing retainer form a non-separable unit for handling prior to final assembly, assembling said bearing members circumjacent said shaft member, and applying an oppositely directed force to said bearing members to cause reverse circumferential displacement thereof and radial outward movement thereof into a loose bearing-forming position circumjacent said shaft member.

9. The method of temporarily securing a plurality of bearing members within a bearing retainer for unit handling prior to final assembly circumjacent a shaft member, and comprising the steps of disposing a plurality of said bearing members in adjacent arcuate disposition within said bearing retainer with the central axes of said bearing members parallel to the central axis of said bearing retainer, applying force to said bearing members to skew the axes of said bearing members relative to the central axis of said bearing retainer, and radially inwardly displacing said bearing members into frictional locking engagement with one another and said bearing retainer whereby said bearing members and said bearing retainer form a non-separable unit for handling prior to final assembly.

10. A method of securing a plurality of elongated members within a retainer by disposing said elongated members in adjacent disposition within said retainer member, applying force to said elongated members to skew the axes thereof relative to the central axis of said retainer member, and concurrently displacing said elongated members into frictional locking engagement with one another to thereby secure said elongated members within said retainer.

References Cited in the file of this patent
UNITED STATES PATENTS

| | | |
|---|---|---|
| 2,102,460 | Heim | Dec. 14, 1937 |
| 2,215,134 | Rehnberg | Sept. 17, 1940 |
| 2,312,615 | Allen | Mar. 2, 1943 |